(12) United States Patent
Tojo et al.

(10) Patent No.: US 7,319,811 B2
(45) Date of Patent: Jan. 15, 2008

(54) INFORMATION PROCESSING APPARATUS AND METHOD

(75) Inventors: Hiroshi Tojo, Tokyo (JP); Satoshi Nakayama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1122 days.

(21) Appl. No.: 10/186,641

(22) Filed: Jul. 2, 2002

(65) Prior Publication Data

US 2003/0016942 A1     Jan. 23, 2003

(30) Foreign Application Priority Data

Jul. 5, 2001    (JP)    ............................. 2001-205018

(51) Int. Cl.
- H04N 5/76    (2006.01)
- H04N 7/00    (2006.01)
- H04N 5/00    (2006.01)

(52) U.S. Cl. ......................................... 386/96; 386/126
(58) Field of Classification Search ................... 386/1, 386/46, 95, 96, 126; 348/231.99, 231.3, 348/240.99, 240.3
See application file for complete search history.

(56) References Cited

U.S. PATENT DOCUMENTS

| | | | | |
|---|---|---|---|---|
| 4,862,285 A | 8/1989 | Miyakawa | .................... | 358/451 |
| 5,402,170 A | 3/1995 | Parulski et al. | ............. | 348/211 |
| 5,402,171 A | 3/1995 | Tagami et al. | ............... | 348/219 |
| 5,561,531 A * | 10/1996 | Funazaki | ..................... | 386/95 |
| 5,581,362 A | 12/1996 | Sakaue et al. | ................. | 386/95 |
| 5,666,160 A | 9/1997 | Hwang | ........................ | 348/240 |
| 5,845,011 A | 12/1998 | Miyamoto et al. | .......... | 382/232 |
| 5,926,218 A | 7/1999 | Smith | .......................... | 348/358 |
| 5,973,857 A | 10/1999 | Kaneda | ...................... | 359/701 |
| 5,990,947 A | 11/1999 | Okino et al. | ................. | 348/240 |
| 5,995,201 A | 11/1999 | Sakaguchi | .................... | 355/55 |
| 6,097,431 A * | 8/2000 | Anderson et al. | ......... | 348/231.7 |
| 2001/0000970 A1 | 5/2001 | Ejima | .......................... | 348/232 |
| 2001/0003464 A1 | 6/2001 | Niikawa | ..................... | 348/341 |

FOREIGN PATENT DOCUMENTS

| | | |
|---|---|---|
| EP | 0 608 099 A1 | 7/1994 |
| EP | 0 698 993 A2 | 2/1996 |
| EP | 0 837 428 A2 | 4/1998 |
| EP | 1 024 444 A2 | 8/2000 |
| JP | 7-67032 | 3/1995 |
| JP | 7-99605 | 4/1995 |

(Continued)

*Primary Examiner*—Thai Q. Tran
*Assistant Examiner*—Nigar Chowdhury
(74) *Attorney, Agent, or Firm*—Fitzpatrick, Cella, Harper & Scinto

(57) ABSTRACT

A moving image processing apparatus can perform a zoom process for each frame image of moving image data in an digital zoom section. An image quality determining section determines an image quality of a frame image obtained through the zoom process in reproduction, when this zoom process is performed, and passes quality information representing its determined result to an MPEG CODEC. The MPEG CODEC encodes the moving image data processed in the digital zoom section and a noise reduction section, and stores the image data, and the quality information associated with each frame in a storage medium. In this manner, when the reproduction object data is processed to have some effect on the quality in reproduction, the data can be provided with the information regarding the quality in reproduction.

15 Claims, 14 Drawing Sheets

FOREIGN PATENT DOCUMENTS

| | | |
|---|---|---|
| JP | 7-200632 | 8/1995 |
| JP | 10-304306 | 11/1998 |
| JP | 11-298849 | 10/1999 |
| JP | 2000-132949 | 5/2000 |
| JP | 2000-350234 | 12/2000 |
| JP | 2000-358206 | 12/2000 |
| JP | 2001-036843 | 2/2001 |
| JP | 2001-069441 | 3/2001 |

* cited by examiner

FIG. 6

| | | |
|---|---|---|
| DIGITAL ZOOM | DIGITAL ZOOMING MODE [4 bit] | DESCRIBE DIGITAL ZOOM MODE WITH ID DISABLE=0, ENABLE=1 |
| | DIGITAL ZOOMING QUALITY [4 bit] | DESCRIBE QUALITY OF DIGITAL ZOOM WITH ID LOW=0, HIGH=1 |
| | MAGNIFICATION [8 bit(UNSIGNED)] | DESCRIBED MAGNIFICATION WITH VALUE A IN EXPRESSION DEFINED SUCH AS MAGNIFICATION OF DIGITAL ZOOM = $\frac{256}{256-A}$ |

FIG. 11

| START POINT | END POINT | DIGITAL ZOOMING MODE | DIGITAL ZOOMING QUALITY | MAGNIFICATION |
|---|---|---|---|---|
| 0 | 14 | ENABLE | HIGH | 128 |
| 55 | 68 | ENABLE | LOW | 170 |
| ⋮ | ⋮ | ⋮ | ⋮ | ⋮ |

F I G. 13A
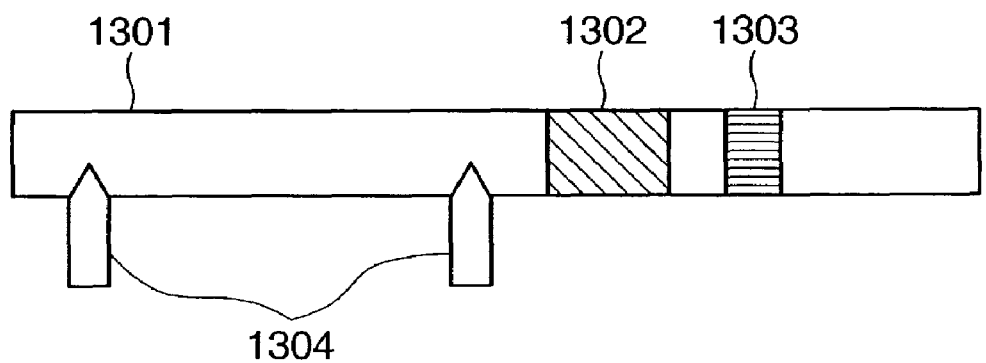
F I G. 13B
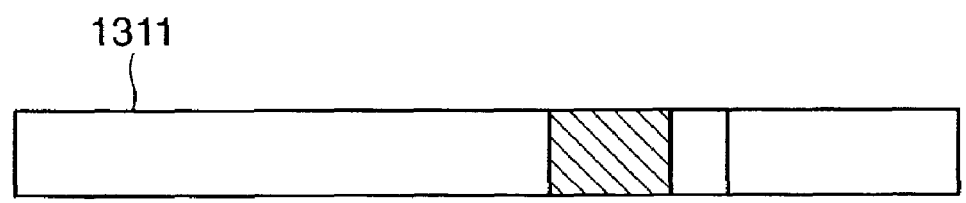
F I G. 13C
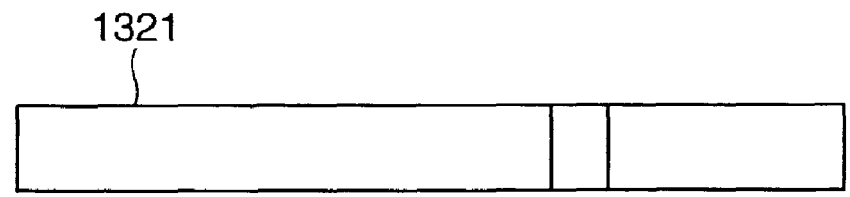

INFORMATION PROCESSING APPARATUS AND METHOD

FIELD OF THE INVENTION

The present invention relates to a technique for recording additive information on a recording medium and utilizing the additive information.

BACKGROUND OF THE INVENTION

Conventionally, there was offered means for recording information sensed by a sensor in an image device and the setting information set by a user along with a moving image, and enabling the moving image to be retrieved, reproduced or printed based on the information, as disclosed in Japanese Patent Laid-Open No. 7-99605, Japanese Patent Laid-Open No. 7-200632, Japanese Patent Laid-Open No. 11-298849, Japanese Patent Laid-Open No. 2000-350234, and Japanese Patent Laid-Open No. 2000-358206. For example, ON or OFF state and the magnifying power of the digital zoom described as the digital zoom information are utilized for retrieving a frame which has been magnified at a predetermined digital zoom power, as disclosed in Japanese Patent Laid-Open No. 7-99605.

However, even if the image device is operated in the same manner, the image quality obtained as a result of the process may be varied due to a difference in the processing method. For example, in the digital zoom, it is common practice that a part of an image captured by the image pickup element is cut out and enlarged. With this method, in enlargement, insufficient pixels are interpolated from neighboring pixels, resulting in degraded image quality. However, a method of preventing the degradation in the image quality that is caused by an interpolation process of pixels was proposed (Japanese Patent Laid-Open No. 7-67032). Also, there is an image device in which the digital zoom system is changed depending on the magnifying power. In this way, with the different processing method, there occurs a difference in the image quality after the digital zoom process. And if the information regarding the image quality caused by a difference in the processing method is utilized in printing the frame image, for example, it is possible to avoid printing the frames of bad image quality. With the prior techniques, however, only the information sensed by the sensor and the setting information set by the user could be described as the additive information, and therefore, the utilization of image quality as discussed above (or determination of the image quality) was impossible.

SUMMARY OF THE INVENTION

The present invention has been achieved in the light of the above-mentioned problems, and it is an object of the invention to provide the data to be reproduced with information regarding the image quality in reproduction, when the data is processed to have some effect on the image quality in reproduction.

Also, it is another object of the invention to enhance the operability, employing the information regarding the image quality in reproduction.

In order to attain the above objects, an information processing apparatus according to this invention includes: processing means for processing data intended for reproduction; determination means for determining a quality of the data in reproduction after processing the data by the processing means to generate quality information representing its quality, and storage means for storing the data processed by the processing means and the quality information obtained by the determination means in association with each other.

Also, another information processing apparatus according to this invention includes: acquisition means for acquiring reproduction object data and the quality information of each portion of the reproduction object data from the data composed of the reproduction object data and the quality information representing the quality of the reproduction object data in reproduction, the quality information being associated with the reproduction object data; and display means for displaying the reproduction object data or the information indicating the reproduction object data based on the quality information acquired by the acquisition means.

An information processing method according to this invention includes: a processing step of processing data intended for reproduction; a determination step of determining a quality of the data in reproduction after processing the data at the processing step to generate the quality information representing its quality; and a storing step of storing the data processed at the processing step and the quality information obtained at the determination step in association with each other.

Also, another information processing method according to this invention includes: an acquisition step of acquiring reproduction object data and associated quality information from the data including the reproduction object data and the quality information representing the quality of the reproduction object data in reproduction, the quality information being associated with the reproduction object data; and a display step of displaying the reproduction object data or the information indicating the reproduction object data based on the quality information acquired at the acquisition step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 6 is a diagram showing a format example of digital zoom information in this embodiment.

FIG. 11 is a diagram for explaining a way of recording the digital zoom information in each interval.

FIGS. 13A to 13C are views showing a display example of the user interface with a moving image editing device.

DETAILED DESCRIPTION OF THE PREFERRED EMBODIMENTS

Preferred embodiments of the present invention will now be described in detail in accordance with the accompanying drawings.

Figure 1:
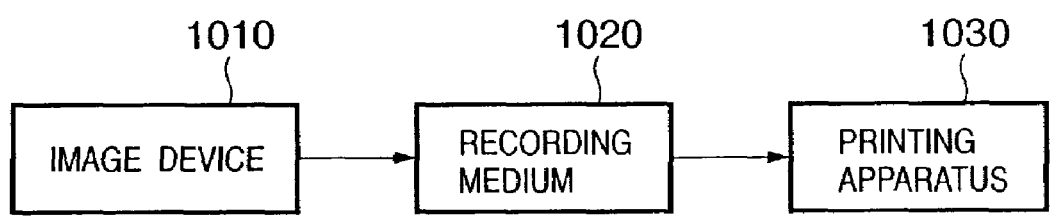
FIG. 1 is a block diagram showing a configuration of a moving image processing apparatus to which the present invention is applicable.

FIG. 1 is a block diagram showing a configuration of a moving image processing apparatus to which the present invention is applicable. In FIG. 1, reference numeral 1010 denotes an image device for picking up a moving image, 1020 denotes a storage medium for storing the moving image, and 1030 denotes a printer for printing a specified frame image extracted from the moving image contained in the storage medium 1020.

Figure 2:
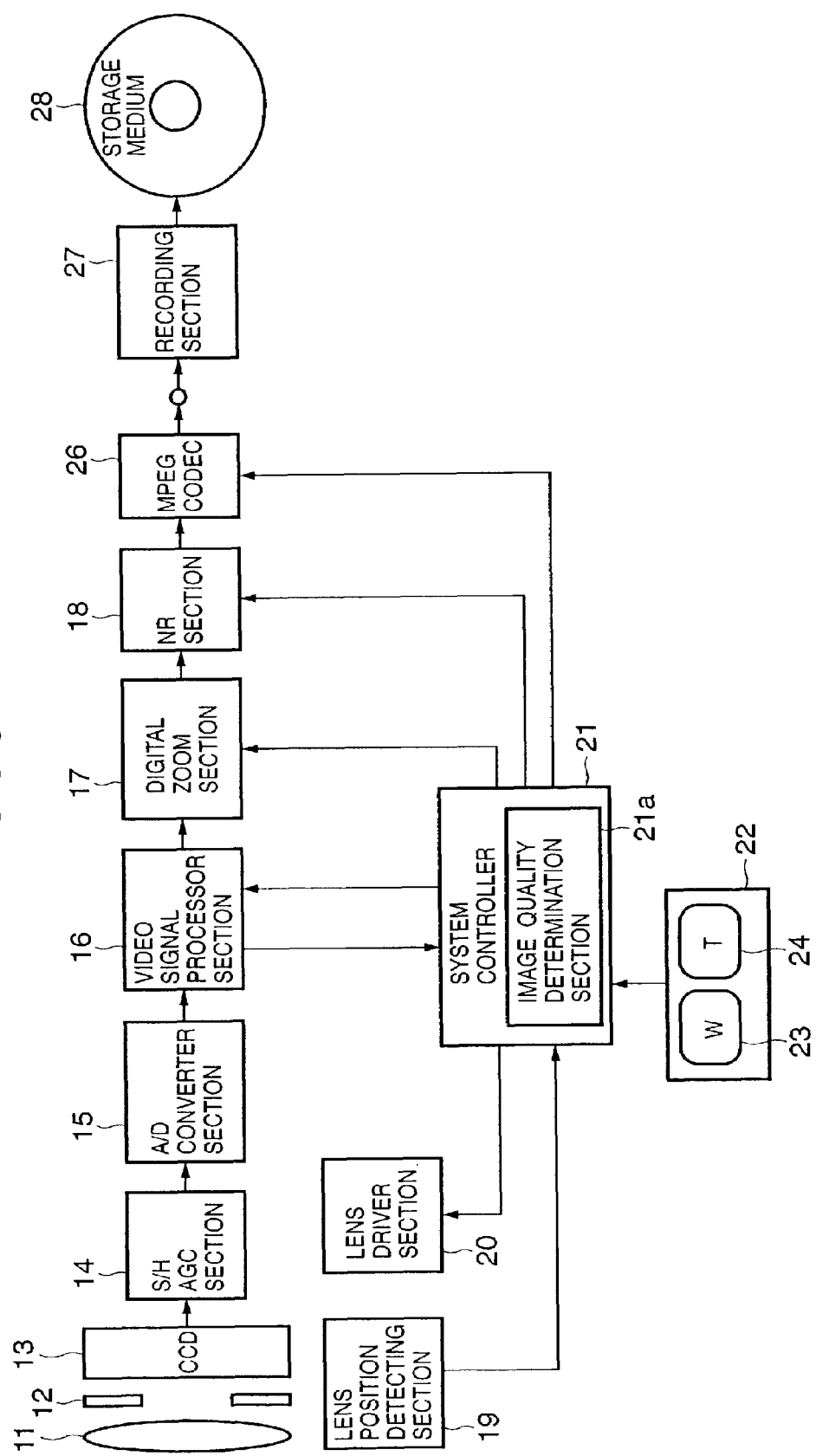
FIG. 2 is a block diagram showing a configuration of an image device according to an embodiment of the invention.

Next, the configuration and its control method of the image device 1010 according to the invention, and storage medium 1020 will be described below. FIG. 2 is a block diagram showing a configuration of the image device according to the invention. In FIG. 2, reference numeral 11 denotes a zoom lens for forming an image of the subject, 12 denotes a diaphragm for adjusting a quantity of light, 13 denotes an image pickup element composed of a CCD for converting input light into an electric signal, and 14 denotes a sample hold AGC circuit section for performing the sample hold and gain adjustment.

Reference numeral 15 denotes an A/D converter for performing an analog/digital conversion (A/D conversion), and 16 denotes a video signal processor for performing the signal processing to produce a video signal. Reference numeral 17 denotes a digital zoom section having a field memory for performing the digital zoom by cutting out a video and executing the enlargement and interpolation process on the video. Reference numeral 18 denotes a noise reduction (NR) section having a field memory for removing the noise from the video signal. The noise reduction (NR) section 18 is composed of a cyclic noise reduction circuit. Reference numeral 19 denotes a lens position detecting section for detecting the position of a lens, and 20 denotes a lens driver section for driving the lens.

Figure 3:
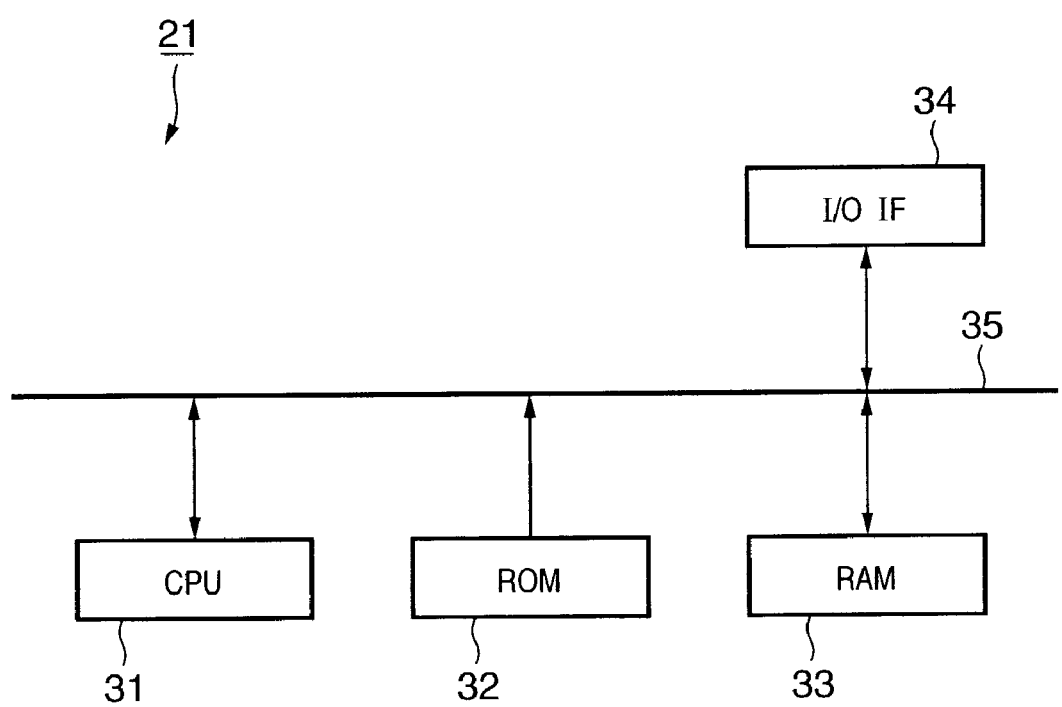
FIG. 3 is a block diagram showing a configuration of a system control section 21.

Reference numeral 21 denotes a system controller for controlling an entire image device. FIG. 3 is a block diagram showing a configuration of the system controller 21. The system controller 21 has a well known CPU 31, a ROM 32, a RAM 33, an I/O interface 34, and a bus 35. The ROM 32 stores a program to be executed by the CPU 31 and table values. The system controller 21 has an image quality determining section 21a for determining the image quality in reproduction based on the processed contents by the digital zooming section 17, as will be described later in connection with the flowcharts of FIGS. 4A and 4B.

Reference numeral 22 is a zoom operation key section having the operation keys for the zoom operation. Reference numeral 23 denotes a wide-angle key for operating the zoom in a wide-angle direction (wide-angle=image reduction). Reference numeral 24 denotes a telephoto key for moving the lens in a telephoto direction (telephoto=image enlargement). The wide-angle key 23 and the telephoto key 24 are interlock keys of the seesaw type, in which an output signal indicating which key is pressed with what extent of pressure is output to the system controller 21.

Reference numeral 26 denotes an MPEG CODEC for encoding the video data into the MPEG format. Reference numeral 27 denotes a recording section composed of a recorder for recording the information by driving the recording medium. Reference numeral 28 denotes the recording medium, such as an optical disk, a magnetic disk, an optical magnetic disk, a magnetic tape, a hard disk, and a non-volatile semiconductor memory (flash memory).

The image pickup operation of the image device according to the embodiment with the above constitution will be briefly described below. A light from the subject that has received the light from the zoom lens 11 has its light quantity adjusted by the diaphragm 12, and forms an image on the plane of the image pickup element 13. And after the image is converted into an electric signal by the image pickup element 13, the electric signal is sampled and gain-adjusted by the sample hold AGC section 14. The signal from the sample hold AGC section 14 is A/D converted by the A/D converter 15, and input into the video signal processor 16.

In the video signal processor 16, processings such as aperture correction, gamma correction and white balance correction are performed against an input signal every brightness and color component to generate the video signal which is output to the digital zoom section 17. The digital zoom section 17 cuts out an image, and performs the enlargement and interpolation process using the field memory, so that the ratio of output video to input video may be the magnifying power designated by a control signal from the system controller 21. An output video from the digital zoom section 17 is input into the noise reduction section 18.

The noise reduction section 18 removes the noise from the video signal by being controlled based on a control signal from the system controller 21. The video signal whose noise has been removed is output to the MPEG CODEC 26. The MPEG CODEC 26 encodes the input video signal. At this time, the MPEG CODEC 26 stores the control information (hereinafter referred to as digital zoom information) input from the system controller 21, together with the encoded video signal, and outputs it to the recording apparatus connected to the MPEG CODEC 26. A method of storing the digital zoom information will be described later.

The system controller 21 controls each section of the image device, and controls the lens driving section 20 or the digital zoom section 17 to move the zoom lens 11 in the wide-angle or telephoto direction, if the wide-angle key 23 or the telephoto key 24 of the zooming operation key section 22 is pressed. Also, the system controller 21 determines where the zoom lens 11 is located, the telephoto end (telephoto endmost point), the wide-angle end (wide-angle endmost point), or some place between the telephoto end and the wide-angle end (zoom magnification), based upon a lens position detection signal from the lens position detecting section 19. Here, the function of enlarging an image picked up by the lens optical system is called an optical zoom, and the function of enlarging the image in vertical or horizontal direction through the electronic signal processing without relying on the lens optical system is called a digital zoom.

The system controller 21 usually performs the optical zoom by driving the zoom lens 11 in a range of magnifying power that is settable in the optical zoom, and electronically enlarges the image by the digital zoom under the control of the digital zoom section 17, after the zoom lens 11 reaches the telephoto end. In this embodiment, the optical zoom has a maximum magnifying power of twelve, and the digital zoom has a maximum magnifying power of four, whereby the zoom operation having a high magnifying power of forty eight can be performed.

Also, the system controller 21 switches the control value of the noise reduction process according to whether the optical zoom or the digital zoom is in operation, and outputs a control signal to the noise reduction section 18. Thereby, the effective amount of noise reduction, namely, the removal amount of noise is controlled. The control value to be switched is a cyclic factor K.

The switching of the control value for the noise reduction section 18 may be also made based on the brightness of the subject. For example, with a lower brightness of the subject, the S/N ratio of the video signal is worse, whereby the control value is switched to increase the effective amount of noise reduction to make up for it.

Further, the system controller 21 controls the diaphragm 12, the sample hold AGC section 14, and an electronic shutter (not shown in FIG. 2) to maintain the generated video signal at a predetermined level value for the amount of light from the subject, whereby the brightness of the subject is judged comprehensively, employing the diaphragm value, the AGC gain and the electronic shutter speed for use in the exposure control.

Figure 4A:
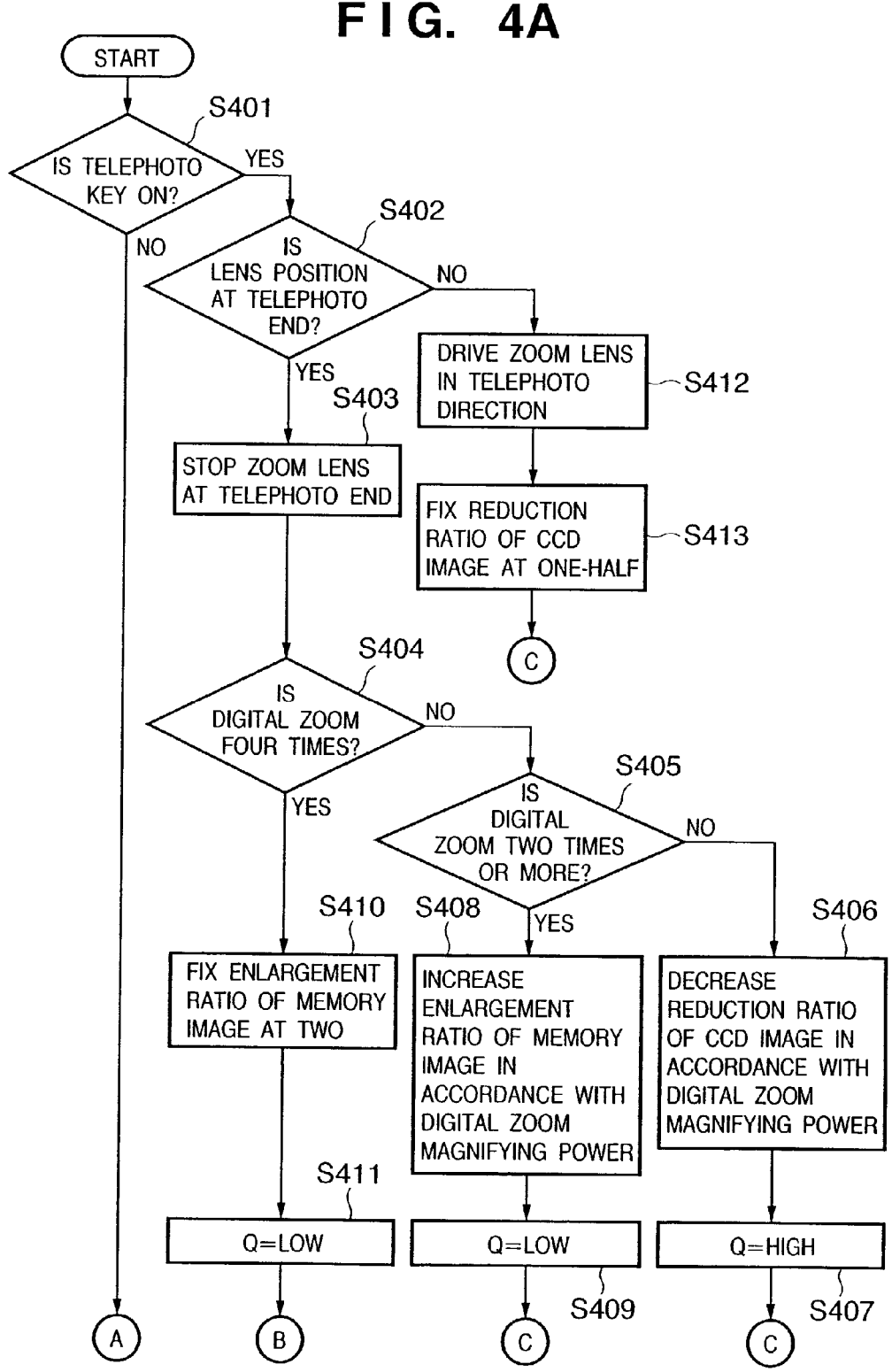
FIG. 4A is a flowchart showing a digital zoom and a noise reduction control processing procedure.
Figure 4B:
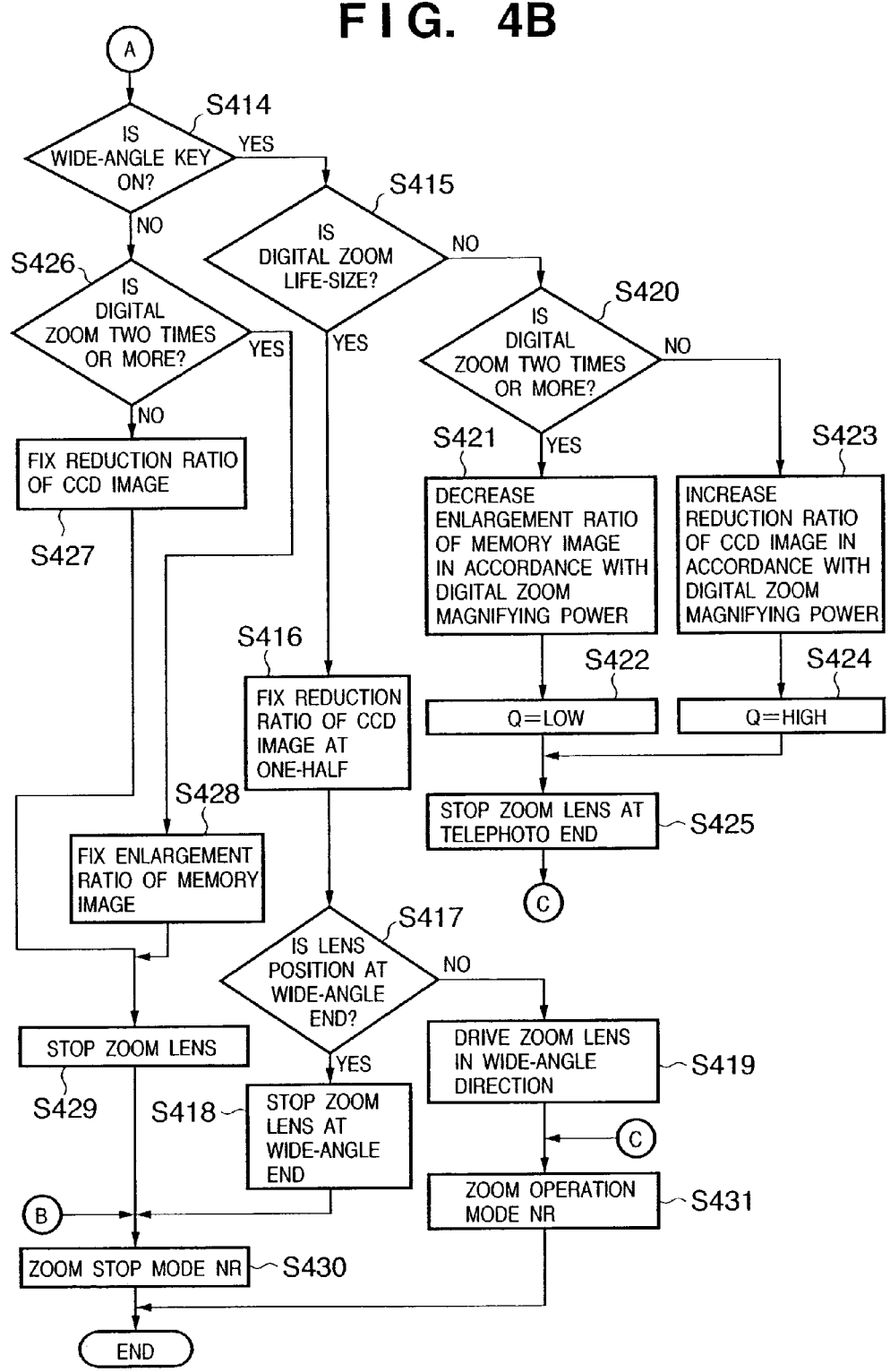
FIG. 4B is a flowchart showing the digital zoom and the noise reduction control processing procedure.

Next, the control for the optical zoom, the digital zoom and the noise reduction by the system controller 21 will be described below. FIGS. 4A and 4B are flowcharts showing a digital zoom and noise reduction control processing procedure. This processing program is stored in the ROM 32 within the system controller 21, and executed by the CPU 31.

First of all, the system controller 21 determines whether or not the telephoto key 23 is turned on (step S401). If the telephoto key 24 is turned on, it is determined whether or not the position of the zoom lens 11 is at the telephoto end (optical zoom magnifying power is twelve) (step S402). If the position of the zoom lens 11 is at the telephoto end, the zoom lens 11 is stopped at the telephoto end (step S403). And it is determined whether or not the digital zoom magnifying power by the digital zoom section 17 is equal to a maximum of four (step S404). If not, the digital zoom section 17 is controlled to increase the magnifying power at a predetermined variable power ratio (from step S405 to step S409). On one hand, if the digital zoom ratio is equal to the maximum of four, the digital zoom magnifying power is kept four (steps S410, S411). In this embodiment, the optical zoom magnifying power is the maximum of twelve, and the digital zoom magnifying power is the maximum of four, but other magnifying powers may be used.

Figure 5A:
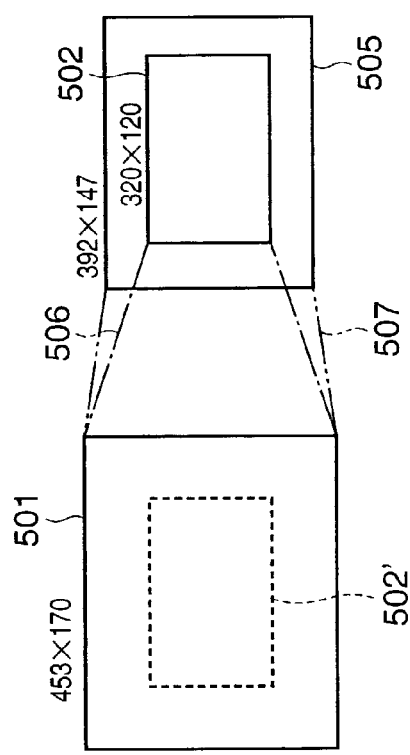
FIGS. 5A and 5B are explanatory views for explaining a zooming process with a digital zoom section 17.

The processing procedure of the digital zoom section 17 from step S405 to step S409 will be described below with reference to FIG. 5 that is a concept view for enlargement by the digital zoom. To enhance the image quality in the digital zoom, the image device of this embodiment involves different digital zoom methods, depending on whether the magnifying power is in a range from one to two or from two to four. Thus, it is firstly determined whether or not the digital zoom magnifying power is two or greater (step S405).

When the magnifying power is less than two (i.e., from one time to twice), the procedure goes to step S406, where the reduction ratio of CCD image is decreased in accordance with a digital zoom magnifying power. Refeffing to FIG. 5A, this process will be described below.

On the image pickup element 13, a range twice as large as a utilization area 502 that is equal to one screen to be actually recorded (frame or field, but the frame is used here for the simplification of explanation) is employed (501). When the digital zoom is not used (i.e., the digital zoom is at one magnifying power), an image pickup element image 501 is reduced half (506) into a size of 502. For example, if 502 is 320×120 pixels, 501 is 453×170 pixels of double size. Though the image quality is slightly degraded by reduction, the number of pixels for the image pickup element is employed to be larger than that of the utilization area to offset the degradation.

And, in a range of magnifying power from one to two, the reduction ratio is changed in accordance with the magnifying power. For example, when the digital zoom has a magnifying power of one and a half, the image is reduced into a size as large as 392×147 pixels that is (1.5/2) size by the thinning process of the pixels (507). That is, when the digital zoom has a magnifying power of N, the image as large as 501 is reduced into N/2. And an area (502) of 320×120 pixels around the center of image is cut out and passed to the noise reduction section 18. In this manner, in the range of magnifying power from one to two, the digital zoom is implemented by changing the reduction ratio of CCD image in accordance with the magnifying power.

The reduction ratio is decreased as the magnifying power of digital zoom is increased. As a result, the number of pixels of the image pickup element used for digital zoom processing (the number of pixels used to form an image in the area 502) is decreased. However, since the degradation due to the reduction process is also decreased, the image quality can be kept almost equal. That is, in the digital zoom processing with the magnifying power from one to two, the image quality can be kept almost equivalent to that when the digital zoom is not in use. Thus, the image quality determination section 21a of the system controller 21 determines that the reproduced image quality is excellent, and set Q to HIGH. This information, together with the digital zoom magnifying power, is passed to the MPEG CODEC 26, and stored in a format as will be described later (step S407).

Figure 5B:
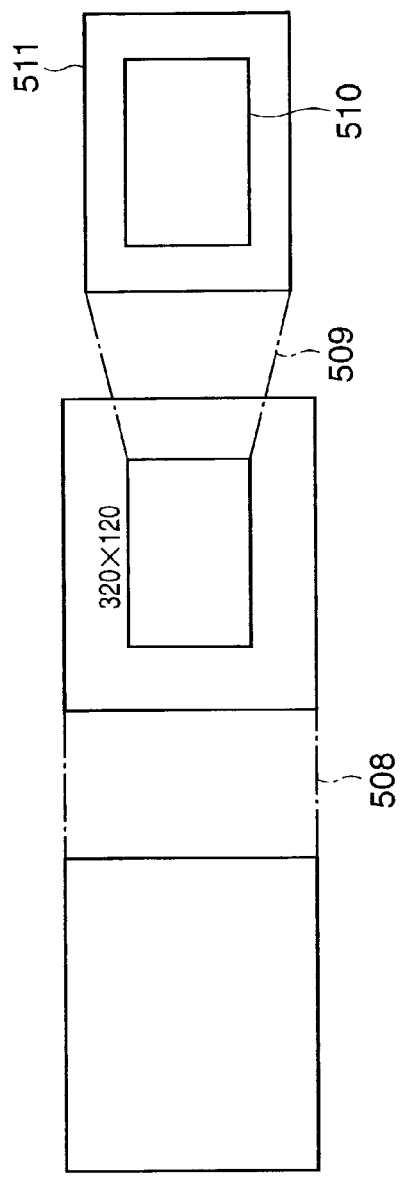

On the other hand, at step S405, if the digital zoom has a magnifying power of two or more (i.e., the digital zoom with the magnifying power of two to four), the procedure goes to step S408. At step S408, the enlargement ratio of image in the memory is increased in accordance with the digital zoom magnifying power. Referring to FIG. 5B, this process will be described below.

In the case where the digital zoom has a magnifying power from two to four, an image of the image pickup element is taken into the memory without reduction (508), a utilization area as large as 320×120 pixels (hereinafter referred to as memory image) is cut out from around the center of image in the memory, and enlarged in accordance with the digital zoom magnifying power (509). The image (510) corresponding to the utilization area as large as 320×120 pixels is cut out again from the image (511) after enlargement and passed to the noise reduction section 18. In enlargement, insufficient pixels are required to be interpolated from the neighboring pixels, resulting in degraded image quality. Thus, the image quality determination section 21a of the system controller 21 determines that the reproduced image has a lower image quality and sets Q to LOW. This information, together with the digital zoom magnifying power, is passed to the MPEG CODEC 26, and stored in a format as will be described later (step S409).

At step S404, if the digital zoom has a magnifying power of four time, the enlargement ratio of memory image is fixed at a maximum of twice, because the digital zoom magnifying power gets to the maximum (step S410). At this time, since the image quality is degraded, the image quality determination section 21a of the system controller 21 set Q to LOW. This information, together with the digital zoom magnifying power, is passed to the MPEG CODEC 26, and stored in a format as will be described later (step S411).

On the other hand, if the position of the zoom lens 11 is not at the telephoto end at step S402, the lens driving section 20 (in telephoto direction) is controlled so that the magnifying power of the zoom lens 11 may be increased at a predetermined variable power ratio (step S412). And the reduction ratio of image on the image pickup element is fixed at one-half (step S413).

On one hand, if the telephoto key 24 is not turned on at step S401, it is determined whether or not the wide-angle key 23 is turned on (step S414). If the wide-angle key 23 is turned on, it is determined whether or not the digital zoom magnifying power by the digital zoom section 17 is a minimum value (one time) (step S415).

If the digital zoom magnifying power is the minimum value (one time), the digital zoom section 17 is controlled so that the magnifying power of digital zoom be kept one time, whereby the digital zoom section fixes the reduction ratio of image on the image pickup element at one-half (step S416). Then, it is determined whether or not the position of the zoom lens 11 is at the wide-angle end (optical zoom magnifying power of one) (step S417). If so, the zoom lens 11 is stopped at the wide-angle end (step S418). On the other hand, if the position of the zoom lens 11 is not at the wide-angle end, the lens driving section 20 is controlled so that the magnifying power of the zoom lens is reduced at a predetermined variable power ratio (wide-angle direction driving) (step S419).

On one hand, if the magnifying power of the digital zoom is not one at step S415, the digital zoom section 17 is controlled so that the magnifying power of the zoom lens is reduced at a predetermined variable power ratio (from step S420 to step S425). As described above, since the method of the digital zoom is different depending on whether or not the magnifying power is greater than two, it is firstly determined whether or not the digital zoom has a magnifying power of two or more (step S420). At the magnifying power of two or more, the enlargement ratio of memory image is decreased in accordance with the magnifying power of digital zoom (step S421). For the above reason, the image quality of reproduced image is degraded in this state, and accordingly, the image quality determination section 21a of the system controller 21 sets Q to LOW. This information, together with the digital zoom magnifying power, is passed to the MPEG CODEC 26, and stored in a format as will be described later (step S422). On the other hand, if it is determined that the digital zoom magnifying power is less than two, the reduction ratio of image on the image pickup element is increased in accordance with the magnifying power of digital zoom (step S423). The image quality of reproduced image can be kept high in this state, whereby the image quality determination section 21a of the system controller 21 sets Q to HIGH. Under the control of the system controller 21, this information, together with the digital zoom magnifying power, is passed to the MPEG CODEC 26, and stored in a format as will be described later (step S424), and the zoom lens 11 is stopped at the telephoto end (step S425).

On one hand, at step S414, if the wide-angle key 23 is not turned on, the digital zoom section 17 is controlled so that the magnifying power of digital zoom is not variable but fixed (from step S426 to step S428). The digital zoom section 17 determines whether or not the digital zoom has a magnifying power of two or more (step S426). If the magnifying power is less than two, the reduction ratio of image on the image pickup element is fixed (S427). On the contrary, if it is two or more, the enlargement ratio of memory image is fixed (S428). And the lens driving section 20 is controlled so that the magnifying power of the zoom lens 11 is not variable but fixed, whereby the zoom lens 11 is stopped (step S429).

And in a state where the digital zoom section 17 and the zoom lens 11 are stopped, the noise reduction section 18 is controlled to place the control mode of noise reduction in a zoom stop mode (step S430). On one hand, in a state where either one of the digital zoom section 17 and the zoom lens 11 is operated, the noise reduction section 18 is controlled to place the control mode of noise reduction in a zoom operation mode (step S431). Then, once the system controller 21 ends this process, it controls each section of the image device to repeat the above process from step S401 to step S431 again.

Next, a method of recording the digital zoom information together with the moving image will be described below. The digital zoom information of this embodiment contains the image quality information Q that is set up at steps S407, S409, S411, S422, and S424.

In recording the digital zoom information, a method of utilizing an unused area of the management information for each frame of the image data may be employed. More specifically, for an MPEG-2 stream, the digital zoom information is stored in the user data area of a picture header or the user data area of a GOP header. Or the image quality information may be stored in correspondence to an identifier (frame ID) for designating each frame.

Next, the format for recording the digital zoom information will be described below. FIG. 6 is a diagram showing a format example of digital zoom information in this embodiment. In Digital Zooming Quality, the quality (the content of image quality information Q) corresponding to the digital zoom method is described. If an image of high quality is obtained, it is described as High, or if the image quality is degraded, it is described as Low. For example, when the digital zoom is used at a magnifying power of one to two, High is written, or when it is used at a magnifying power of two to four, Low is written in this embodiment.

If the image device is equipped with a plurality of digital zoom methods, and the image without degradation in the image quality is obtained by any of the digital zoom methods, High may be always written in Digital Zooming Quality. Employing the image device having a single digital zoom method, High or Low may be described in Digital Zooming Quality, depending on the degree of degradation in the image quality.

In FIG. 6, Digital Zoom Mode is a mode of a digital zoom, in which Disable or Enable of Digital Zoom Mode is written. Magnification is the digital zoom magnification described in a form of factors which satisfy an expression of FIG. 6. For the frames in which the digital zoom is not used, the information is not described.

The configuration and operation of a printer 1030 according to this embodiment will be described below.

Figure 7:
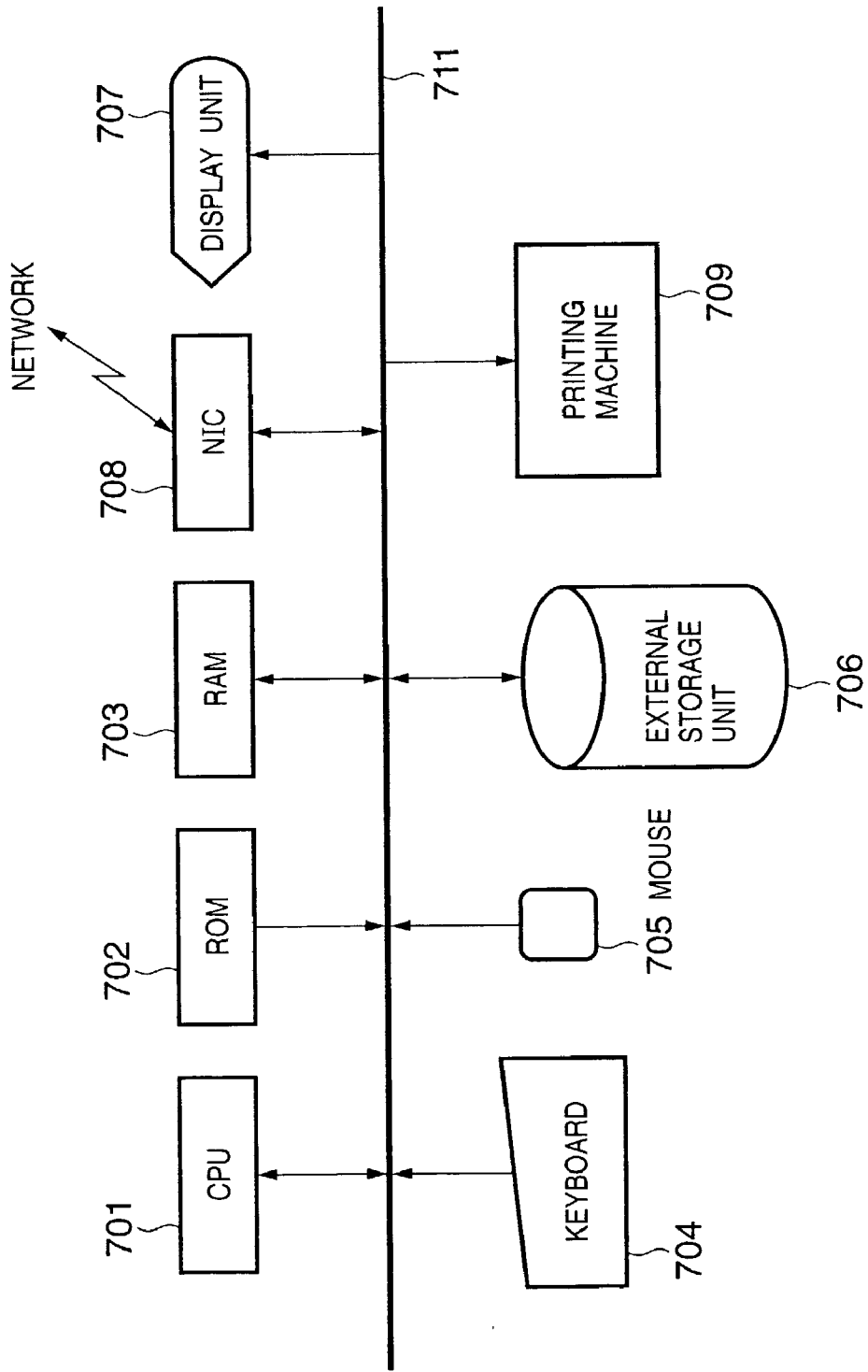
FIG. 7 is a block diagram showing a control configuration of a printer according to this embodiment of the invention.

FIG. 7 is a block diagram showing the control configuration of the printer according to this embodiment. In FIG. 7, reference numeral 701 denotes a CPU that makes the control of the moving image processing apparatus of this embodiment. Reference numeral 702 denotes a ROM for storing a boot program or various sorts of data to be employed at the time of starting up this processing apparatus. Reference numeral 703 denotes a RAM for storing a control program to be executed by the CPU 701, and providing a working area for the CPU 701 to perform various sorts of control. Reference numeral 704 denotes a keyboard, and 705 denotes a mouse for providing various input operation environments for the user.

Reference numeral 706 denotes an external storage unit, which is composed of a hard disk, a floppy disk, an optical disk, a magnetic disk, an optical magnetic disk, or a magnetic tape. Reference numeral 707 denotes a display unit composed of a display to provide the results to the user. Reference numeral 708 denotes a network interface for enabling the communication with various devices on the network. Reference numeral 709 denotes a printing apparatus composed of a printer.

Figure 8:
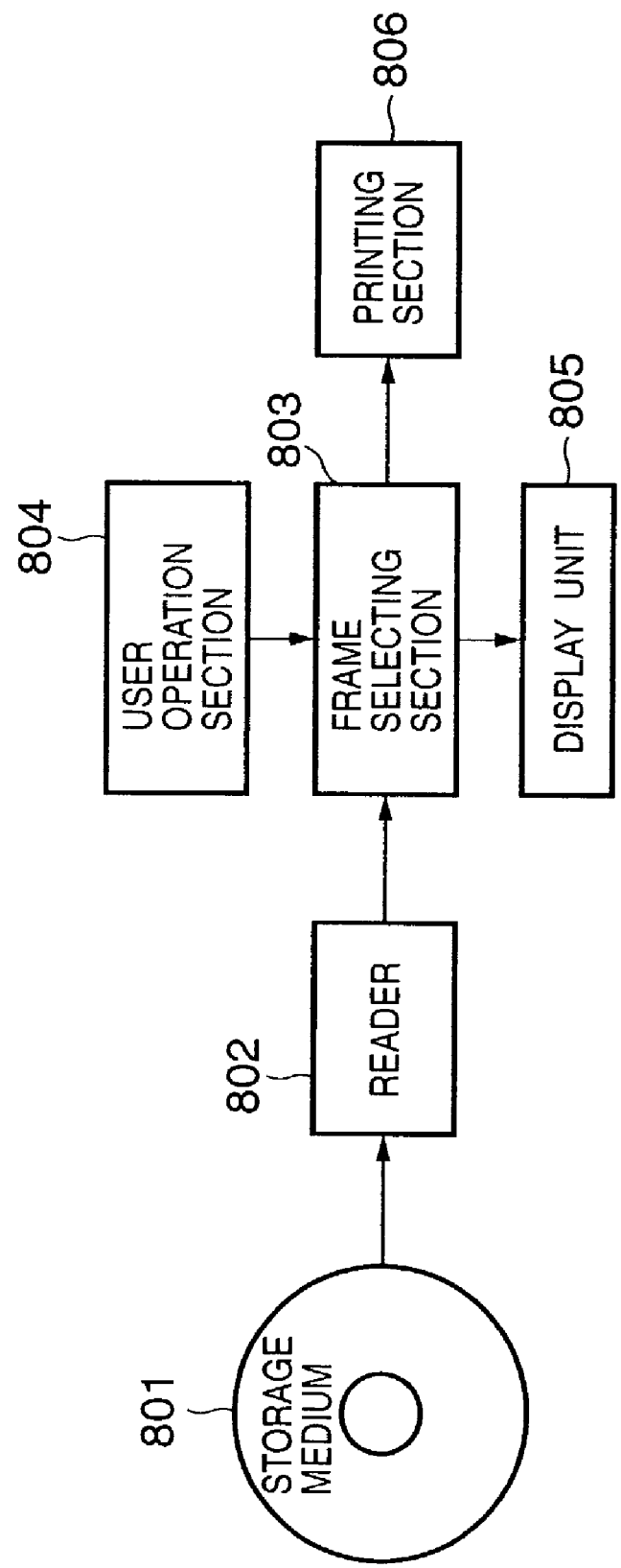
FIG. 8 is a block diagram showing a functional configuration of the printer.

FIG. 8 is a block diagram showing the functional configuration of the printing apparatus. Reference numeral 801 denotes a recording medium that corresponds to the recording medium 28 in FIG. 2. A reading section 802 reads a moving image and the digital zoom information on the recording medium 801. Reference numeral 803 denotes a frame selecting section for deciding a frame in the moving image to be printed. Reference numeral 804 denotes a user operation section composed of the keyboard 704 and the mouse 705 to instruct the selection of frame. Reference numeral 805 denotes a display section for displaying the frame as a print candidate on the display unit 707. Reference numeral 806 denotes a printing section composed of the printing apparatus 709 to print the frame image selected by the frame selecting section 803.

Figure 9A:
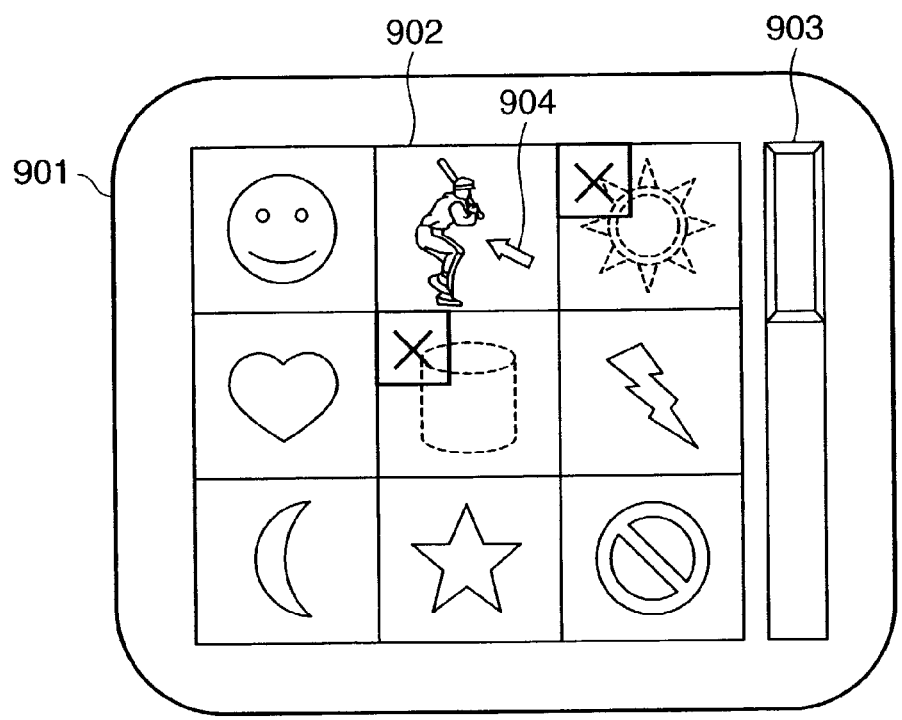
FIGS. 9A and 9B are views illustrating an example of a user interface with a display on a printer side.
Figure 9B:
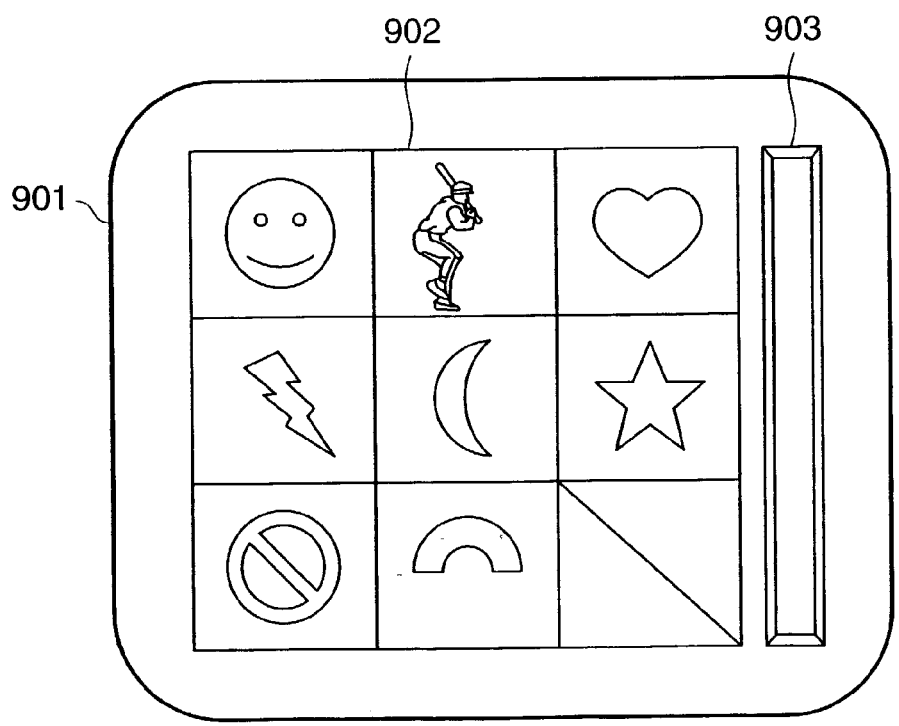

FIGS. 9A and 9B illustrate an example of a user interface with the display unit on the printing apparatus side. Reference numeral 901 denotes a display area. Reference numeral 902 denotes a thumbnail display area in which thumb-nail images consisting of reduced frame images are arranged in time series order, starting from the upper left side, from left to right, and from upper to lower side. Reference numeral 903 denotes a scroll bar for scrolling the thumb-nail images for access, when all thumb-nail images can not be displayed in the thumb-nail area 902 at a time. Reference numeral 904 denotes a pointer that the user can manipulate, employing the mouse 705, to issue various kinds of instruction.

Figure 10:
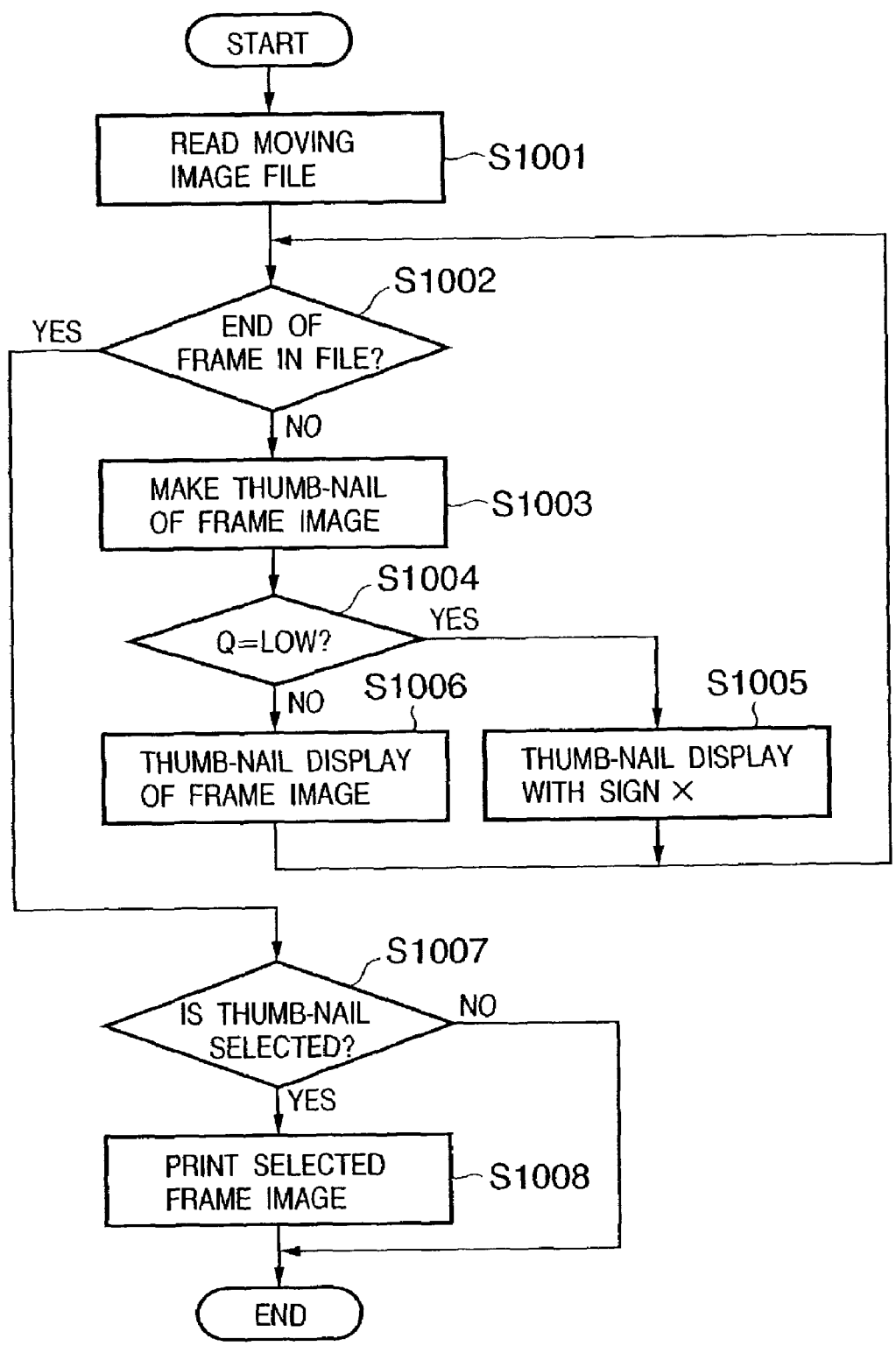
FIG. 10 is a flowchart showing an operation example of the printer.

FIG. 10 is a flowchart showing an operation example of the printing apparatus. This process is performed by the CPU 701 that executes the control program stored in the ROM 702.

First of all, the reading section 802 reads a moving image that the user has designated via the user operation section 804 from the storage medium 801 (step S1001). Then, the frame selecting section 803 reads the frames in the moving image successively and displays them in thumb-nail (from step S1002 to step S1006). Though in this embodiment, each of the frames is made thumb-nail, the frames may be made thumb-nail for every predetermined number of frames.

Step S1002 is an end determination, whereby the process from step S1003 to step S1006 is repeated till all the frames in the moving image are processed. At step S1003, the frame image is reduced into an appropriate size of thumb-nail image to display an arrangement of frame images on the screen, as shown in FIG. 9A. Then, Digital Zooming Quality of the digital zoom information corresponding to the frame image is checked. It is determined whether or not Digital Zooming Quality is Low (step S1004). If it is Low, it is determined that the image quality is degraded. Thus, to invite the user's attention, the thumb-nail of the frame image whose quality is degraded is displayed in a thumb-nail display area 902, along with the × sign as shown in FIG. 9A (step S1005). On the other hand, if it is determined at step S1004 that Digital Zooming Quality is not Low (including the cases where no zoom information exists), the thumb-nail is directly displayed (step S1006).

By repeating the above process, the thumb-nails are displayed in the thumb-nail display area 902. Though not shown in the flowchart, if the maximum number of displaying the thumb-nails in the thumb-nail display area 902 is exceeded, the thumb-nails that can not be displayed are stored in the memory, and when the scroll bar 903 is operated, the corresponding thumbnails are displayed in the thumb-nail display area 902.

After the thumb-nails are displayed in the above manner, it is determined whether or not the user selects the thumb-nail to be printed using the pointer 904 (step S1007). If selected, the frame image corresponding to the selected thumb-nail is printed in the printing section 806 at step S1008.

In the above manner, since the × sign is indicated with the thumb-nail image, it is clearly pointed out that the image quality of the frame image is degraded, whereby the user can utilize it as a yardstick in selecting the frame image to be printed. Generally, the thumb-nail is the greatly reduced frame image, and it is difficult to determine whether or not the image quality is degraded from the thumb-nail image. According to this invention, the user can easily discriminate the image quality.

While in the above embodiment the digital zoom information is added to each frame, it may be stored in a form of having association with each frame. For example, there is a method of storing it in the footer of a moving image file for each interval, as shown in FIG. 11. In FIG. 11, the record is registered for each interval in which Digital Zooming Mode, Digital Zooming Quality, and Magnification are the same. Each interval is indicated by a Start Point and an End Point. The Start Point and the End Point representing the interval can be chosen at will, such as the time information or the frame ID, so long as they are associated with the frame.

While in this embodiment the digital zoom is operated after the zoom lens 11 reaches the telephoto end, of course, the digital zoom may be operated before reaching the telephoto end by providing an operation button for digital zoom.

While in this embodiment, the thumb-nail having the degraded image quality is displayed with the sign ×, thereby inviting the user's attention, as shown in FIG. 9A, it will be appreciated that only the thumb-nails without degradation in the image quality may be displayed, except for the thumb-nails of degraded image quality, as shown in FIG. 9B.

Figure 12A:
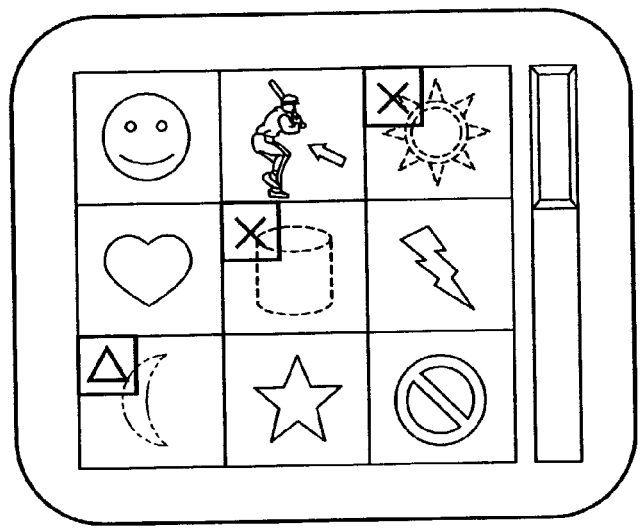
FIGS. 12A to 12C are views showing another example of the user interface with the display on the printer side.
Figure 12B:
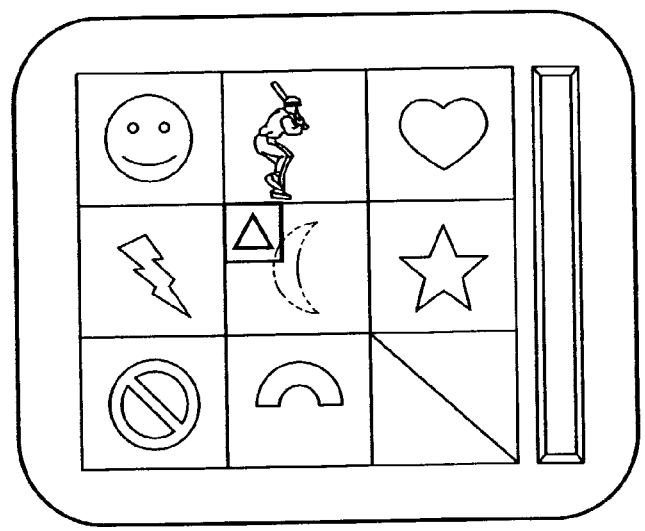
Figure 12C:
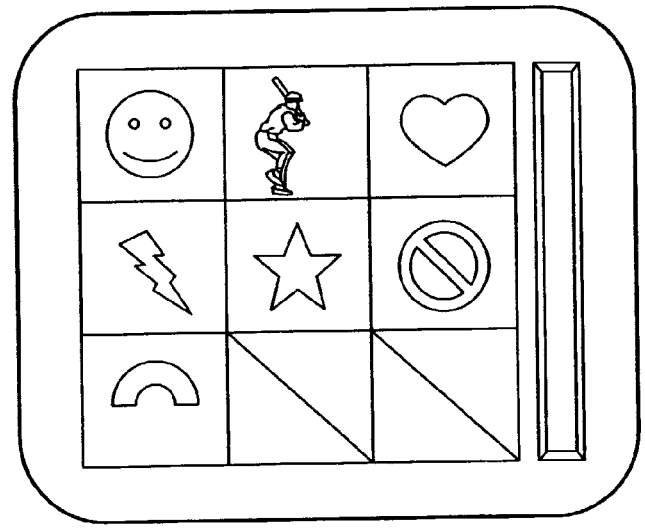

In this embodiment, the image quality is High or Low, but if the image quality is subdivided into three or more levels by the digital zoom processing method. For example, three levels of High, Middle and Low may be employed. Furthermore, the sign may be displayed in such a manner that image quality High is no sign, Middle is Δ sign, and Low is × sign, as shown in FIG. 12A. Also, a display mode may be provided to enable various display of thumb-nails, such that all images are displayed (FIG. 12A), the images of poor image quality are not displayed (FIG. 12B), or the images of excellent image quality are displayed (FIG. 12C).

While in this embodiment the digital zoom information is employed for the printing apparatus, it may be utilized in various kinds of apparatuses, including a moving image editing device, a reproducing apparatus and a retrieval device. In any utilization form, it is possible to realize at least the following three advantages: (1) inviting the user's attention to the frames of degraded image quality, (2) excluding the frames of degraded image quality from the use objects, and (3) displaying the frames in accordance with the degree of degradation in the image quality.

As other apparatuses than the printing apparatus, the moving image editing device is exemplified. FIGS. 13A to 13C are views illustrating a display example of the moving image editing device. In FIG. 13A, reference numeral 1301 denotes a bar representing an entire moving image file. Reference numeral 1304 denotes a position designation pointer that is used in designating the period for editing. Reference numeral 1302 denotes a period where Digital Zooming Quality is Middle in the moving image 1301, and 1302 denotes a period where Digital Zooming Quality is Low. The user can avoid the period with degraded image quality in editing by referring to the display of FIG. 13A.

The periods (1302 and 1303) with degradation in the image quality may be excluded from the display, as shown in FIG. 13C, and the user may be inhibited to select those periods. In response to an instruction from the user, the images may be displayed at several levels, such that all images are displayed, as shown in FIG. 13A, the images except for the period with severe degradation in the image quality are displayed, as shown in FIG. 13B, or the images except for all the periods with degradation in the image quality are displayed, as shown in FIG. 13C. It is apparent that the above display is enabled by referring to Digital Zooming Quality corresponding to the frame.

While in this embodiment, two apparatuses are provided, including the image device 1010 for adding the digital zoom information and the printing apparatus 1030 for printing the digital zoom information, a single apparatus may be provided for realizing the image pickup and the printing.

While in this embodiment, the digital zoom information is passed via the storage medium 1020, it may be conveyed by providing the communication function of the IEEE 1394.

While in this embodiment the moving image is only treated, the still image may be of course treated. In this case, the image quality information corresponding to each still image is stored. That is, the process as shown in FIGS. 4A and 4B is applied to the still image, whereby the quality information Q in the zooming operation of each still image can be obtained. This invention is applicable to the cases where the reproduced image quality is different depending on the processing method, as a result of processing the data, in which the data may be sound and so on.

As described above, according to this embodiment, for example, even if the same operation is done to the image device, the information regarding the difference in the image quality as a result of processing the data, which is caused by the difference in the processing method, can be stored and utilized. For example, in the digital zoom, the information regarding the digital zoom method and the change in the image quality caused through the process is recorded on the recording medium, corresponding to the frame, and utilized by the printing apparatus, the reproducing apparatus, the editing device, or the retrieval device, thereby inviting the user's attention to the frames of bad image quality, not displaying the frames of bad image quality, or displaying the frames at several levels depending on the image quality.

The object of this invention may be also accomplished in such a way that the storage medium for storing the program code of software for implementing the functions of the above embodiment is supplied to the system or apparatus, and the computer (i.e., CPU or MPU) for the system or apparatus reads and executes the program code stored in the storage medium.

In this case, the program code itself read from the storage medium implements the functions of this embodiment, and this invention is constituted of the storage medium for storing its program code.

Examples of the storage medium for supplying the program code include a floppy disk, a hard disk, an optical disk, an optical magnetic disk, a CD-ROM, a CD-R, a magnetic tape, a non-volatile memory card, and ROM. Also, the functions of the above embodiment can be implemented not only when the program is read and executed by the computer, but also when the OS (Operating System) operating on the computer performs all or part of the actual process, based on the instructions of the program code.

Moreover, the functions of the embodiment may be implemented in such a way that the program code read from the storage medium is written into a function extension board inserted into the computer or the memory provided in a function extension unit connected to the computer, and the CPU equipped in the function extension board or function extension unit performs all or part of the actual process, based on the instructions of the program code.

As described above, with this invention, in the case where the data to be reproduced is processed to have some effect on the image quality in reproduction, the data is provided with the information regarding the image quality in reproduction.

Also, with this invention, the apparatus can have enhanced operability, employing the information regarding the image quality in reproduction.

As many apparently widely different embodiments of the present invention can be made without departing from the spirit and scope thereof, it is to be understood that the invention is not limited to the specific embodiments thereof except as defined in the claims.

What is claimed is:

1. An information processing apparatus, comprising:
processing means for processing data intended for reproduction;
determination means for determining, based on a recording condition upon recording, a quality of the data in reproduction after processing of the data by said processing means to generate quality information representing the determined quality; and
storage means for storing the data processed by said processing means and the quality information obtained by said determination means in association with each other,
wherein the data represent moving image data or sound, said determination means determines the quality of the data in reproduction for each predetermined interval of the data to generate the quality information, and said storage means stores the quality information in association with each predetermined interval of the data, and
wherein said storage means stores period information in association with the quality information, the period information indicating a period containing a series of intervals having the quality information indicating the same quality.

2. The information processing apparatus according to claim 1, wherein the data is moving image data and the predetermined interval corresponds to one frame.

3. The information processing apparatus according to claim 2, wherein said storage means stores the quality information by describing the quality information in a predetermined area of each frame.

4. The information processing apparatus according to claim 2, wherein said storage means stores an identifier for identifying each frame in association with the quality information.

5. The information processing apparatus according to claim 2, wherein said processing of data a variable magnification and reduction power control.

6. The information processing apparatus according to claim 1, wherein the data is still image data, and said determination means determines a quality of each still image data in reproduction to generate the quality information representing its quality.

7. The information processing apparatus according to claim 1, wherein the quality information represents the quality in reproduction by a quality level in which the quality is subdivided into a predetermined number of levels.

8. An information processing method, comprising:
 a processing step of processing data intended for reproduction;
 a determination step of determining, based on a recording condition upon recording, a quality of the data in reproduction after processing the data in the processing step to generate quality information representing the determined quality; and
 a storing step of storing the data processed in the processing step and the quality information obtained in the determination step in association with each other,
 wherein the data represent moving image data or sound, the determination step includes determining the quality of the data in reproduction for each predetermined interval of the data to generate the quality information, and the storing step includes storing the quality information in association with each predetermined interval of the data, and
 wherein the storing step includes storing period information in association with the quality information, the period information indicating a series of the predetermined intervals whose quality information indicates the same quality.

9. The information processing method according to claim 8, wherein the data is moving image data and the predetermined interval corresponds to one frame.

10. The information processing method according to claim 9, wherein the storing step includes storing the quality information by describing the quality information in a predetermined area of each frame.

11. The information processing method according to claim 9, wherein the storing step comprises storing an identifier for identifying each frame in association with the quality information.

12. The information processing method according to claim 9, wherein the processing of data involves a variable magnification and reduction power control.

13. The information processing method according to claim 8, wherein the data is the still image data, and the determination step includes determining the quality of each of the still image data in reproduction to generate the quality information representing that data's quality.

14. The information processing method according to claim 8, wherein the quality information represents the quality in reproduction by a quality level in which the quality is subdivided into a predetermined number of levels.

15. A computer-readable medium, encoding a control program for causing a computer to implement an information processing method, comprising:
 a processing step of processing data intended for reproduction;
 a determination step of determining, based on a recording condition upon recording, a quality of the data in reproduction after processing the data in the processing step to generate quality information representing the determined quality; and
 a storing step of storing the data processed in the processing step and the quality information obtained in the determination step in association with each other,
 wherein the data represent moving image data or sound, the determination step includes determining the quality of the data in reproduction for each predetermined interval of the data to generate the quality information, and the storing step includes storing the quality information in association with each predetermined interval of the data, and
 wherein the storing step includes storing period information in association with the quality information, the period information indicating a series of the predetermined intervals whose quality information indicates the same quality.

* * * * *

UNITED STATES PATENT AND TRADEMARK OFFICE
CERTIFICATE OF CORRECTION

PATENT NO. : 7,319,811 B2
APPLICATION NO. : 10/186641
DATED : January 15, 2008
INVENTOR(S) : Hiroshi Tojo et al.

It is certified that error appears in the above-identified patent and that said Letters Patent is hereby corrected as shown below:

ON THE TITLE PAGE [57] ABSTRACT:

Line 2, "an" should read --a--.

COLUMN 2:

Line 1, "quality," should read --quality;--.

COLUMN 5:

Line 63, "Refeffing" should read --Referring--.

COLUMN 6:

Line 34, "set" should read --sets--; and
Line 64, "time," should read --times,--.

COLUMN 7:

Line 1, "set" should read --sets--.

COLUMN 10:

Line 49, "if" should be deleted and "is" should read --may be--.

UNITED STATES PATENT AND TRADEMARK OFFICE
CERTIFICATE OF CORRECTION

PATENT NO. : 7,319,811 B2
APPLICATION NO. : 10/186641
DATED : January 15, 2008
INVENTOR(S) : Hiroshi Tojo et al.

It is certified that error appears in the above-identified patent and that said Letters Patent is hereby corrected as shown below:

<u>COLUMN 13</u>:

Line 6, "data" should read --data involves--.

Signed and Sealed this

Fifth Day of August, 2008

JON W. DUDAS
*Director of the United States Patent and Trademark Office*